(12) United States Patent
Urahama

(10) Patent No.: US 11,011,194 B2
(45) Date of Patent: May 18, 2021

(54) MAGNETIC HEAD CLEANING MECHANISM AND MAGNETIC TAPE DEVICE

(71) Applicant: NEC Platforms, Ltd., Kanagawa (JP)

(72) Inventor: Hidehiro Urahama, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/755,005

(22) PCT Filed: Oct. 17, 2018

(86) PCT No.: PCT/JP2018/038647
§ 371 (c)(1),
(2) Date: Apr. 9, 2020

(87) PCT Pub. No.: WO2019/078245
PCT Pub. Date: Apr. 25, 2019

(65) Prior Publication Data
US 2020/0312355 A1 Oct. 1, 2020

(30) Foreign Application Priority Data
Oct. 19, 2017 (JP) .............................. JP2017-202497

(51) Int. Cl.
*G11B 5/41* (2006.01)
*G11B 15/66* (2006.01)

(52) U.S. Cl.
CPC ................ *G11B 5/41* (2013.01); *G11B 15/66* (2013.01)

(58) Field of Classification Search
None
See application file for complete search history.

(56) References Cited

U.S. PATENT DOCUMENTS

| 5,930,089 | A | | 7/1999 | Anderson | |
|---|---|---|---|---|---|
| 6,067,212 | A | * | 5/2000 | Poorman | G11B 5/41 360/128 |
| 6,166,881 | A | * | 12/2000 | Anderson | G11B 5/41 360/128 |

(Continued)

FOREIGN PATENT DOCUMENTS

| JP | S60-025696 Y | 8/1985 |
|---|---|---|
| JP | S61-110321 A | 5/1986 |

(Continued)

OTHER PUBLICATIONS

International Search Report for PCT Application No. PCT/JP2018/038647, dated Dec. 11, 2018.

(Continued)

*Primary Examiner* — William J Klimowicz

(57) ABSTRACT

A cleaning mechanism is provided with an arm and a drive unit. The arm includes: a holder having a shape that allows a magnetic tape touching a magnetic head to be separated from the magnetic head without wearing the magnetic tape while the magnetic tape is under tension; and a cleaning unit that can be brought into contact with the contact surface of the magnetic head that was touching the magnetic tape while the magnetic tape is separate from the magnetic head. The drive unit drives the arm to separate the magnetic tape touching the magnetic head from the magnetic head without wearing the magnetic tape while the magnetic tape is under tension, and drives the arm so that the cleaning unit comes in contact with the contact surface of the magnetic head that was touching the magnetic tape while the magnetic tape is separate from the magnetic head.

5 Claims, 12 Drawing Sheets

(56) References Cited

U.S. PATENT DOCUMENTS

| | | | |
|---|---|---|---|
| 6,215,618 B1 * | 4/2001 | Anderson | G11B 5/41 360/128 |
| 6,621,656 B2 * | 9/2003 | Underkofler | G11B 15/67 242/332.8 |
| 8,270,113 B2 * | 9/2012 | Ojima | G11B 5/41 360/128 |
| 8,284,519 B2 * | 10/2012 | Sato | G11B 5/41 360/128 |
| 2002/0048118 A1 | 4/2002 | Tanaka et al. | |
| 2002/0057528 A1 | 5/2002 | Yamakawa | |
| 2002/0181145 A1 | 12/2002 | Tsuchiya | |
| 2006/0109589 A1 | 5/2006 | Tsuneyoshi et al. | |
| 2012/0081814 A1 * | 4/2012 | Ojima | G11B 5/41 360/130.31 |
| 2015/0043105 A1 | 2/2015 | Ashikawa | |
| 2017/0178679 A1 | 6/2017 | Ojima | |

FOREIGN PATENT DOCUMENTS

| | | | |
|---|---|---|---|
| JP | H04-283483 A | | 10/1992 |
| JP | H05-258408 A | | 10/1993 |
| JP | H06-131637 A | | 5/1994 |
| JP | H11-296827 A | | 10/1999 |
| JP | 2002-133618 A | | 5/2002 |
| JP | 2002-157715 A | | 5/2002 |
| JP | 2002-367127 A | | 12/2002 |
| JP | 2006-155683 A | | 6/2006 |
| JP | 2012-216256 A | | 11/2012 |
| JP | 2013-073638 A | | 4/2013 |
| JP | 2014-207048 A | | 10/2014 |
| JP | 2015011749 A | * | 1/2015 |
| JP | 2015-056197 A | | 3/2015 |
| JP | 2015-191681 A | | 11/2015 |
| JP | 2018-125055 A | | 8/2018 |
| WO | 2013/168621 A1 | | 11/2013 |

OTHER PUBLICATIONS

English translation of Written opinion for PCT Application No. PCT/JP2018/038647.

* cited by examiner

MAGNETIC HEAD CLEANING MECHANISM AND MAGNETIC TAPE DEVICE

This application is a National Stage Entry of PCT/JP2018/038647 filed on Oct. 17, 2018, which claims priority from Japanese Patent Application 2017-202497 filed on Oct. 19, 2017, the contents of all of which are incorporated herein by reference, in their entirety.

TECHNICAL FIELD

The present invention relates to a technique of cleaning a magnetic head of a magnetic tape device.

BACKGROUND ART

When reading and writing data, a magnetic tape device runs a magnetic tape on a magnetic head. In this instance, the magnetic head and the magnetic tape wear, and abrasion powder remains on a surface of the magnetic head. The abrasion powder deteriorates performance relating to data reading and writing on the magnetic head. The performance deterioration is recoverable by cleaning the magnetic head with a brush or the like. Cleaning of the magnetic head is often performed on demand when performance deterioration of the magnetic head is sensed during reading and writing of data. However, when performed in a state where a magnetic tape is stored (unthreaded) in a cartridge, cleaning of the magnetic head has to be performed with reading and writing of data being interrupted for a relatively long time when performance deterioration of the magnetic head is sensed during reading and writing of data. Accordingly, cleaning of the magnetic head is preferably executable even in a state where a magnetic tape is drawn (threaded) from a cartridge. Note that an operation of unthreading and an operation of threading are collectively referred to as a "threading operation". A mechanism that performs a threading operation is referred to as a "threading mechanism".

On the other hand, in order to extend a life of a magnetic head by reducing wear of the magnetic head, it is preferable to float (lift) a magnetic tape from the magnetic head during running of the magnetic tape in which no reading and no writing of data are performed (cueing of data, rewinding for taking out the magnetic tape, or the like). In order to extend lives of the magnetic head and the magnetic tape by suppressing adhesion of the magnetic head and the magnetic tape during long-time stopping of the magnetic tape (a pause of the magnetic tape or the like), it is also preferable to lift the magnetic tape from the magnetic head during stopping of the magnetic tape. Note that a mechanism that lifts the magnetic tape from the magnetic head is referred to as a "tape lifter mechanism".

One example of a technique of cleaning a magnetic head with a brush is disclosed in PTL 1. A magnetic head cleaning mechanism in PTL 1 includes a fixed gear, an arm, an idle gear, a brush drive gear, and a rotary brush. The fixed gear is attached to a running surface of a magnetic tape on a magnetic head side. The arm rotates on the fixed gear. The idle gear is rotatably attached to the arm in such a way as to mesh with the fixed gear, and rotates during movement of the arm. The brush drive gear is rotatably attached to the arm in such a way as to mesh with the idle gear. The rotary brush is attached to a rotation shaft of the brush drive gear, and a part of outer periphery of the rotary brush serves as a cleaning surface. As a result of the configuration described above, in the magnetic head cleaning mechanism in PTL 1, the rotary brush revolves around the magnetic head while rotating on the own axis, by the rotation of the arm. Thus, the rotary brush cleans a surface of the magnetic head.

Another example of a technique of cleaning a magnetic head with a brush is disclosed in PTL 2. A magnetic head cleaning mechanism in PTL 2 includes a threading arm, a magnetic head, a brush link arm, and a cam gear. The threading arm engages a leader block with a leader pin, and pulls the leader block holding the leader pin. The brush link arm has, at a tip thereof, a brush, and is rotatably supported. The cam gear is placed closer to a magnetic head side than a threader track being a carrying path of a magnetic tape, and drives the threading arm. The brush link arm is located closer to the magnetic head side than the threader track in a normal condition. When the leader block is carried to the vicinity of the leader pin, the brush link arm rotates in conjunction with rotation of the cam gear, and brings the brush into abutment with the magnetic head on the threader track. As a result of the configuration described above, in the magnetic head cleaning mechanism in PTL 2, the brush cleans a surface of the magnetic head by rotation of the cam gear.

Still other examples of techniques of cleaning a magnetic head with a brush are disclosed in PTLs 3 to 8.

In the techniques in PTLs 1 to 8, a magnetic head cleaning mechanism does not have a function of lifting, from a magnetic head, a magnetic tape threaded in a magnetic tape device, or does not function in a state (load state) where a magnetic tape is under tension. Thus, when cleaning a magnetic head, the techniques in PTLs 1 to 8 need to unthread or loosen a magnetic tape. However, in a magnetic tape device in recent years, a magnetic tape is always under tension in such a way that the magnetic tape can be immediately run, or in such a way that the magnetic tape does not deviate from a carrying path and is not damaged by components around. Therefore, the techniques in PTLs 1 to 8 each have a problem of being unable to clean a head in a state where a magnetic tape is threaded in a magnetic tape device.

One example of a technique of lifting a magnetic tape is disclosed in each of PTLs 9 and 10. The technique in each of PTLs 9 and 10 lifts a magnetic tape by a rotator or a rack pinion. However, the technique in each of PTLs 9 and 10 is a technique of lifting a magnetic tape, does not consider cleaning of a magnetic head, and needs a dedicated tape lifter mechanism.

Another example of a technique of lifting a magnetic tape is disclosed in each of PTLs 11 and 12. The technique in each of PTLs 11 and 12 lifts a magnetic tape by a tape cleaning means connected to an actuator. However, the technique in each of PTLs 11 and 12 targets a magnetic tape for cleaning, and is unable to clean a magnetic head.

One example of a technique of lifting a magnetic tape when cleaning a magnetic head is disclosed in PTL 13. An information recording system in PTL 13 includes a recording tape, a magnetic head, a tape isolation mechanism, and a cleaning device. The recording tape runs inside a case by rotation of a pair of reels provided inside the case. The tape isolation mechanism isolates the recording tape from the magnetic head in a thickness direction. In a state where the recording tape is isolated from the magnetic head, the cleaning device cleans the magnetic head with a cleaning tape while winding off the cleaning tape wound around a supply reel. As a result of the configuration described above, the information recording system in PTL 13 cleans a magnetic head without unthreading a magnetic tape.

CITATION LIST

Patent Literature

[PTL 1] Japanese Examined Utility Model (Registration) Application Publication No. S60-025696
[PTL 2] Japanese Unexamined Patent Application Publication No. 2014-207048
[PTL 3] Japanese Unexamined Patent Application Publication No. 2015-056197
[PTL 4] Japanese Unexamined Patent Application Publication No. 2013-073638
[PTL 5] Japanese Unexamined Patent Application Publication No. 2006-155683
[PTL 6] Japanese Unexamined Patent Application Publication No. H06-131637
[PTL 7] Japanese Unexamined Patent Application Publication No. S61-110321
[PTL 8] Japanese Unexamined Patent Application Publication No. 2002-367127
[PTL 9] Japanese Unexamined Patent Application Publication No. 2015-191681
[PTL 10] Japanese Patent Application No. 2017-18124
[PTL 11] Japanese Unexamined Patent Application Publication No. H05-258408
[PTL 12] Japanese Unexamined Patent Application Publication No. H04-283483
[PTL 13] Japanese Unexamined Patent Application Publication No. 2012-216256

SUMMARY OF INVENTION

Technical Problem

In the information recording system in PTL 13, a tape isolation mechanism and a cleaning device are independent. Moreover, the cleaning device cleans a magnetic head by a cleaning tape. Therefore, the information recording system in PTL 13 has a problem that a mechanism performing cleaning of a magnetic head is complicated. A complicated cleaning mechanism becomes a cause of an increase in manufacturing cost or an increase in device size, in a magnetic tape device.

The present invention has been made in view of the problems described above, and a main object thereof is to perform cleaning of a magnetic head without unthreading a magnetic tape by a simple mechanism.

Solution to Problem

In one aspect of the present invention, a magnetic head cleaning mechanism includes a cleaning arm including a holder forming a shape capable of separating a magnetic tape contacting a magnetic head from the magnetic head without wearing the magnetic tape in a state where the magnetic tape is under tension, and a cleaning unit capable of contacting a contact surface of the magnetic head that contacts the magnetic tape in a state where the magnetic tape is separate from the magnetic head, and a cleaning arm drive unit driving the cleaning arm in such a way as to separate the magnetic tape contacting the magnetic head from the magnetic head without wearing the magnetic tape in a state where the magnetic tape is under tension, and driving the cleaning arm in such a way that the cleaning unit comes in contact with the contact surface of the magnetic head that contacts the magnetic tape in a state where the magnetic tape is separate from the magnetic head.

In one aspect of the present invention, a magnetic tape device includes a magnetic head cleaning mechanism including a cleaning arm having a holder forming a shape capable of separating a magnetic tape contacting a magnetic head from the magnetic head without wearing the magnetic tape in a state where the magnetic tape is under tension, and a cleaning unit capable of contacting a contact surface of the magnetic head that contacts the magnetic tape in a state where the magnetic tape is separate from the magnetic head, and a cleaning arm drive unit driving the cleaning arm in such a way as to separate the magnetic tape contacting the magnetic head from the magnetic head without wearing the magnetic tape in a state where the magnetic tape is under tension, and driving the cleaning arm in such a way that the cleaning unit comes in contact with the contact surface of the magnetic head that contacts the magnetic tape in a state where the magnetic tape is separate from the magnetic head.

Advantageous Effects of Invention

The present invention has an advantageous effect of being able to perform cleaning of a magnetic head without unthreading a magnetic tape by a simple mechanism.

EXAMPLE EMBODIMENT

Hereinafter, example embodiments of the present invention will be described in detail with reference to the drawings. Note that, in all the drawings, the same reference sign is given to equivalent components, and description thereof is omitted appropriately.

First Example Embodiment

A configuration according to the present example embodiment is described.

Figure 1:
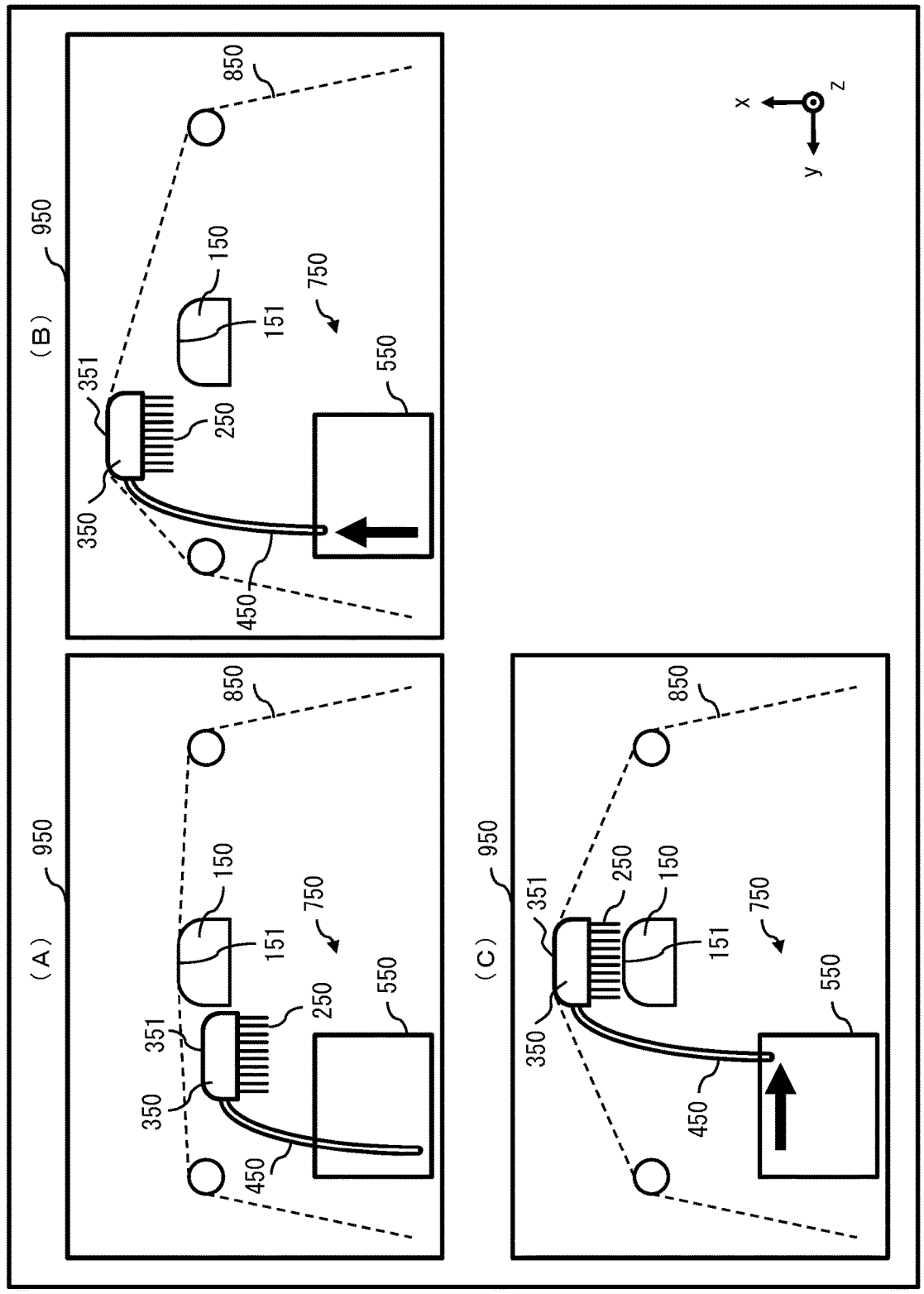
FIG. 1 is a schematic view illustrating one example of a configuration of a magnetic tape device according to a first example embodiment of the present invention.

FIG. 1 is a schematic view illustrating one example of a configuration of a magnetic tape device according to a first example embodiment of the present invention. More specifically, Portion (A) of FIG. 1 is a schematic perspective plan view of the magnetic tape device, representing a waiting state of cleaning, Portion (B) of FIG. 1 is a schematic perspective plan view of the magnetic tape device, representing a lift state of a magnetic tape, and Portion (C) of FIG. 1 is a schematic perspective plan view of the magnetic tape device, representing an execution state of cleaning. Note that, in each of the drawings from FIG. 1 onward, a depth direction of the magnetic tape device is referred to as an "X-axis direction", a width direction thereof is referred to as a "Y-axis direction", and a thickness direction thereof is referred to as a "Z-axis direction" (an upward direction from the surface of FIG. 1), but the location of the magnetic tape device in space is not limited.

A magnetic tape device 950 according to the present example embodiment includes a magnetic head 150, a cleaning arm 450, and a cleaning arm drive unit 550.

The magnetic head 150 performs reading and writing of data on a magnetic tape 850.

The cleaning arm 450 includes a holder 350 and a cleaning unit 250.

The holder 350 has a shape that allows the magnetic tape 850 contacting the magnetic head 150 to be separated from the magnetic head 150 without wearing the magnetic tape 850 in a state where the magnetic tape 850 is under tension. For example, the holder 350 has a smooth operation surface 351 being disposed at one end of the cleaning arm 450, and being slidable without wearing the magnetic tape 850.

The cleaning unit 250 is capable of contacting a contact surface 151 of the magnetic head 150 that was contacting the magnetic tape 850 in a state where the magnetic tape 850 is separate from the magnetic head 150.

For example, the cleaning unit 250 is disposed on a back side of the operation surface 351. The cleaning unit 250 is, for example, a brush or nonwoven fabric.

The cleaning arm drive unit 550 drives the cleaning arm 450. Herein, the cleaning arm drive unit 550 may drive the cleaning arm 450 by common drive force being provided from a drive power source (a motor or the like) and being shared with another drive mechanism (a threading mechanism or the like). Alternatively, the cleaning arm drive unit 550 may drive the cleaning arm 450 by drive force being provided from a drive power source and being independent from another drive mechanism.

Referring again to FIG. 1, an operation according to the present example embodiment is described.

The cleaning arm drive unit 550 drives the cleaning arm 450 in such a way that the magnetic tape 850 contacting the magnetic head 150 is separated from the magnetic head 150 without wearing the magnetic tape 850 in a state where the magnetic tape 850 is under tension. For example, the cleaning arm drive unit 550 pushes, by the operation surface 351, the magnetic tape 850 away from a side opposite to the contact surface 151 of the magnetic head 150 (Portion (B) of FIG. 1).

Furthermore, the cleaning arm drive unit 550 drives the cleaning arm 450 in such a way that the cleaning unit 250 comes in contact with the contact surface 151 of the magnetic head 150 that was contacting the magnetic tape 850 in a state where the magnetic tape 850 is separate from the magnetic head 150. For example, the cleaning arm drive unit 550 moves the cleaning unit 250 to a position facing the contact surface 151, and brings the cleaning unit 250 into contact with the contact surface 151 (Portion (C) of FIG. 1).

The cleaning arm 450 may be used as a tape lifter function that does not involve cleaning of the magnetic head 150.

As described above, in the magnetic tape device 950 according to the present example embodiment, the cleaning arm 450 is driven in a thread state where the magnetic tape 850 is under tension (a state where the magnetic tape 850 is wound in the magnetic tape device 950). Thus, the magnetic tape 850 can be lifted (separated) from the magnetic head 150 by the cleaning arm 450 without unthreading the magnetic tape 850 (bringing the magnetic tape 850 into a state of not being wound in the magnetic tape device 950), or loosening tension of the magnetic tape 850.

Consequently, the magnetic head 150 can be cleaned while maintaining a high-speed running state or a stop state of the magnetic tape 850. In addition, in the magnetic tape device 950, a tape lifter mechanism and a magnetic head cleaning mechanism are achieved by using an integrated cleaning arm 450 having a simple structure. Therefore, the magnetic tape device 950 according to the present example embodiment has an advantageous effect of being able to perform cleaning of a magnetic head without unthreading a magnetic tape by a simple mechanism.

In the magnetic tape device 950 according to the present example embodiment, a tape lifter mechanism and a magnetic head cleaning mechanism are achieved by using the integrated cleaning arm 450. Further, in order to achieve a tape lifter function and a magnetic head cleaning function, the cleaning arm drive unit 550 may drive the integrated cleaning arm 450. Accordingly, the magnetic tape device 950 does not need to have a drive mechanism in which a tape lifter mechanism is independent from a magnetic head cleaning mechanism. Therefore, the magnetic tape device 950 according to the present example embodiment has an advantageous effect of being able to suppress an increase in manufacturing cost or an increase in device size.

Second Example Embodiment

Next, a second example embodiment of the present invention based on the first example embodiment of the present invention is described. A magnetic tape device according to the present example embodiment cleans a magnetic head by utilizing a threading mechanism.

A configuration according to the present example embodiment is described.

Figure 2:
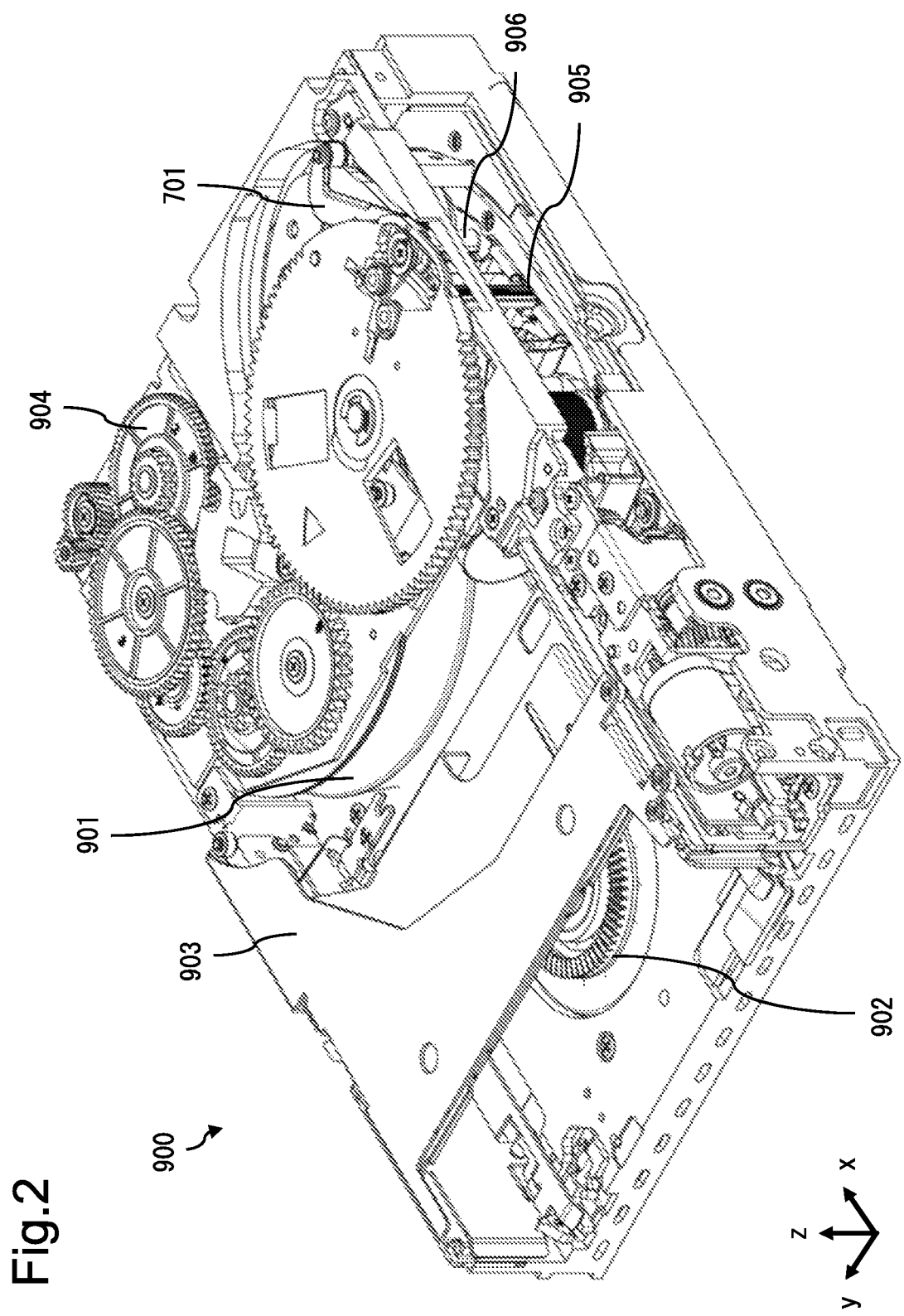
FIG. 2 is a perspective view illustrating one example of a configuration of a magnetic tape device according to a second example embodiment of the present invention.

FIG. 2 is a perspective view illustrating one example of a configuration of a magnetic tape device according to the second example embodiment of the present invention. More specifically, FIG. 2 is a perspective view in which an uncovered magnetic tape device 900 according to the present example embodiment is seen obliquely from an upper side. FIG. 2 illustrates a state (an unthread state) in which a magnetic tape cartridge is not inserted in the magnetic tape device 900.

As illustrated in FIG. 2, the magnetic tape device 900 includes an in-device magnetic tape winding reel 901, an in-cartridge magnetic tape winding reel 902, a cartridge load mechanism 903, a threading mechanism 904, a magnetic head mechanism 905, and a magnetic head cleaning mechanism 906.

Figure 3:
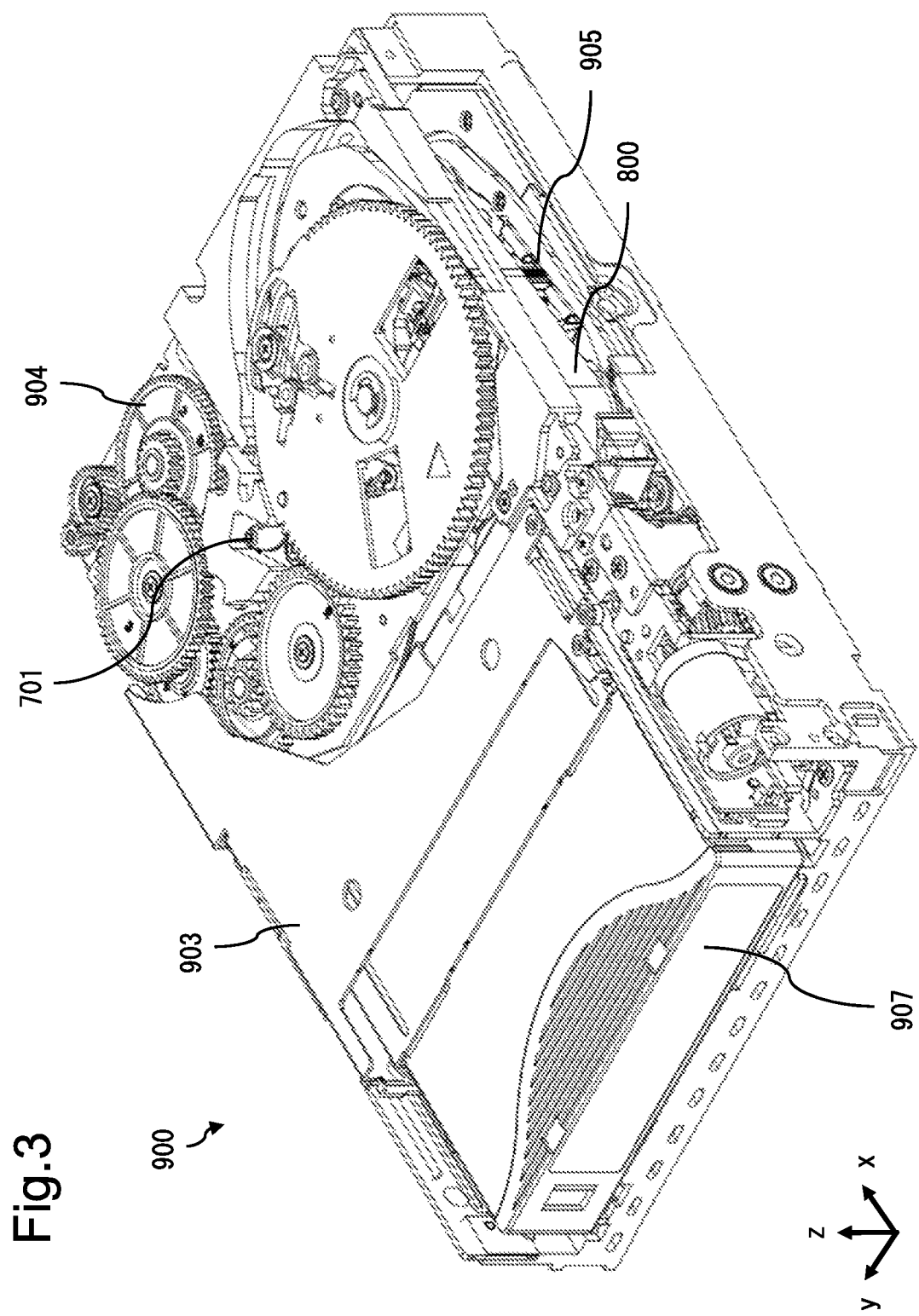
FIG. 3 is a perspective view illustrating one example of a configuration of a magnetic tape device according to the second example embodiment of the present invention.

FIG. 3 is a perspective view illustrating one example of a configuration of the magnetic tape device according to the second example embodiment of the present invention. More specifically, FIG. 3 illustrates a state (a thread state, and a thread complete state) in which a magnetic tape cartridge 907 is inserted in the magnetic tape device 900, and a magnetic tape 800 is wound around the in-device magnetic tape winding reel 901 illustrated in FIG. 2 (not illustrated in FIG. 3).

When the magnetic tape cartridge 907 is inserted, the magnetic tape device 900 carries the magnetic tape cartridge 907 into the device by the cartridge load mechanism 903. Then, the magnetic tape device 900 mounts the magnetic tape cartridge 907 in such a way that a gear (not illustrated) disposed at a bottom portion of the magnetic tape cartridge 907 engages with a gear included in the in-cartridge magnetic tape winding reel 902.

The threading mechanism 904 moves a threading arm component 701 into the magnetic tape cartridge 907 mounted inside the magnetic tape device 900, by transmitting rotational drive force of a drive source (a drive power source such as a motor) via a gear train.

The threading arm component 701 grasps a pin (not illustrated) provided at the tip of the magnetic tape 800, and then, is moved while pulling the magnetic tape 800 up to a center of the in-device magnetic tape winding reel 901. The magnetic tape 800 pulled up to the center of the in-device magnetic tape winding reel 901 is wound and rewound from inside of the magnetic tape cartridge 907 into the magnetic tape device 900 or in an opposite direction by the in-device magnetic tape winding reel 901 and the in-cartridge magnetic tape winding reel 902 being rotated. Herein, the in-device magnetic tape winding reel 901 and the in-cartridge magnetic tape winding reel 902 are controlled in such a way as to draw each other and rotate together, in order that the magnetic tape 800 may be under predetermined tension.

The magnetic head mechanism 905 is disposed in such a way that the magnetic tape 800 under tension contacts a contact surface of a magnetic head 100 (not illustrated, described later) in order to enable data recorded in the magnetic tape 800 to be read and written. The magnetic head mechanism 905 records or reads a plurality of data rows in or from the magnetic tape 800 by translating the magnetic head 100 perpendicularly to a winding direction of the magnetic tape 800.

The magnetic head cleaning mechanism 906 is disposed between the threading mechanism 904 and the magnetic head mechanism 905. The magnetic head cleaning mechanism 906 moves a brush 200 (not illustrated, described later) being a magnetic head cleaning member, and a holder 300 (not illustrated, described later) holding the brush 200, by utilizing drive force of the threading mechanism 904. The brush 200 and the holder 300 move in such a way that the magnetic tape 800 is separated (lifted) from the magnetic head 100 in a state where the magnetic tape 800 is wound in the magnetic tape device 900, and the magnetic tape 800 is under tension. As a result of the movement, the brush 200 and the holder 300 perform lifting of the magnetic tape 800 and cleaning of the magnetic head in parallel.

Figure 4:
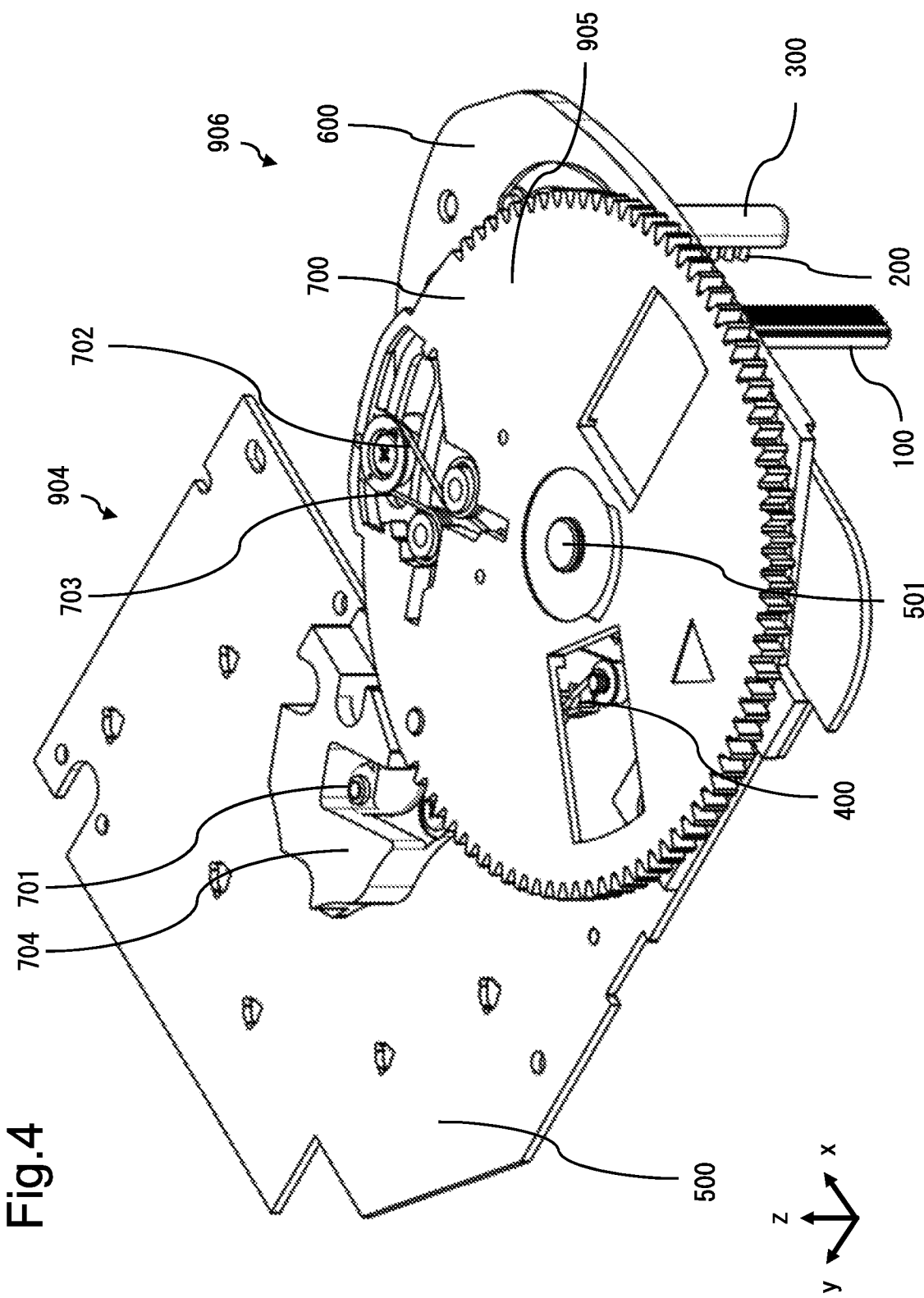
FIG. 4 is a perspective view illustrating, obliquely from an upper side, one example of a configuration of a magnetic head cleaning mechanism according to the second example embodiment of the present invention.

FIG. 4 is a perspective view illustrating, obliquely from an upper side, one example of a configuration of a magnetic head cleaning mechanism according to the second example embodiment of the present invention. More specifically, FIG. 4 is an essential part bird's eye view in which a part of the threading mechanism 904 and the magnetic head cleaning mechanism 906 in FIG. 2 are extracted and then seen in the same direction as in FIG. 2.

Figure 5:
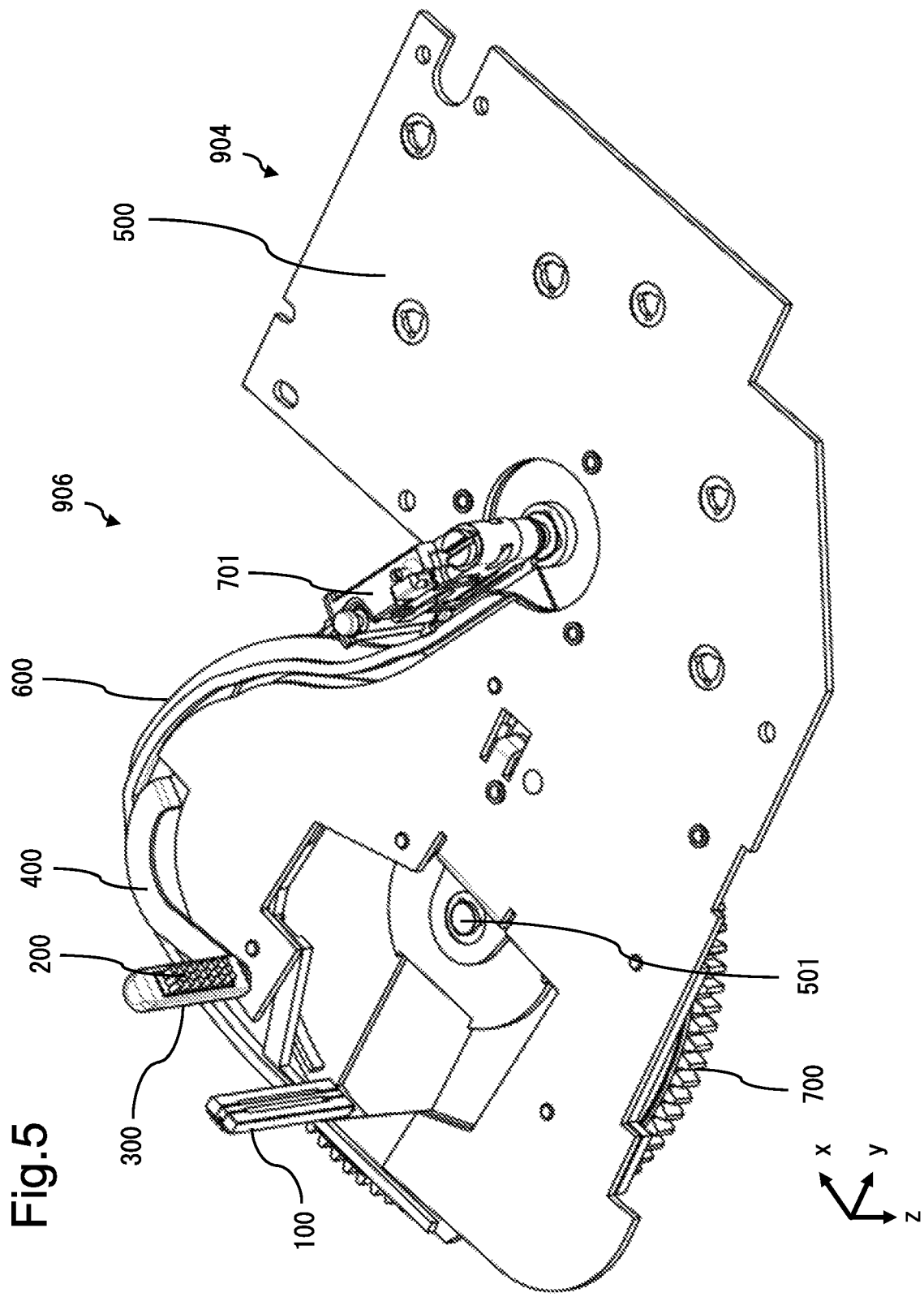
FIG. 5 is a perspective view illustrating, obliquely from a lower side, one example of a configuration of a magnetic head cleaning mechanism according to the second example embodiment of the present invention.

FIG. 5 is a perspective view illustrating, obliquely from a lower side, one example of a configuration of a magnetic head cleaning mechanism according to the second example embodiment of the present invention. More specifically, FIG. 5 is an essential part bird's eye view in which FIG. 4 is seen from a direction exactly opposite thereto.

The magnetic head cleaning mechanism 906 includes a cam gear 700, a brush arm component 400, and a cam plate 600. The magnetic head cleaning mechanism 906 is placed on a base 500 being a part of the threading mechanism 904.

The cam gear 700 drives the threading arm component 701 that carries the magnetic tape 800.

The brush arm component 400 is a link mechanism that moves the brush 200.

The cam plate 600 guides movement of the brush 200.

The brush 200 is attached to the tip of the brush arm component 400 via the holder 300.

The holder 300 has, on a back surface of a part holding the brush 200, a smooth surface where the magnetic tape 800 is slidable without being damaged.

The cam gear 700 is attached on a cam gear shaft 501 press-fit in the base 500 rotatably clockwise and counterclockwise when seen from an upper side. The cam gear 700 rotates by a gear or the like transmitting, thereto, rotational force from a drive source (a motor or the like, not illustrated). The cam gear 700 holds the threading arm component 701 via a spring for thread-side overdrive 702 and a spring for unthread-side overdrive 703.

A thread stopper 704 defines a thread complete position by collision of the threading arm component 701 when the cam gear 700 rotates counterclockwise.

The spring for thread-side overdrive 702 is elastically deformed when the threading arm component 701 is further rotated (overdriven: rotated beyond a rotation range in threading) counterclockwise from a position where the threading arm component 701 has collided with the thread stopper 704. Thus, the spring for thread-side overdrive 702 permits the cam gear 700 to be overdriven from the thread complete position.

An unthread stopper (not illustrated) defines an unthread complete position by collision of the threading arm component 701 when the cam gear 700 rotates clockwise.

The spring for unthread-side overdrive 703 is elastically deformed when the threading arm component 701 is further rotated (overdriven) clockwise from a position where the threading arm component 701 has collided with the unthread stopper. Thus, the spring for unthread-side overdrive 703 permits the cam gear 700 to be overdriven from the unthread complete position.

Note that details of the threading arm component 701, and a configuration that draws and pulls the magnetic tape 800 from the magnetic tape cartridge 907 by the threading arm component 701 are publicly known as a threading method, and therefore, description thereof is omitted.

Figure 6:
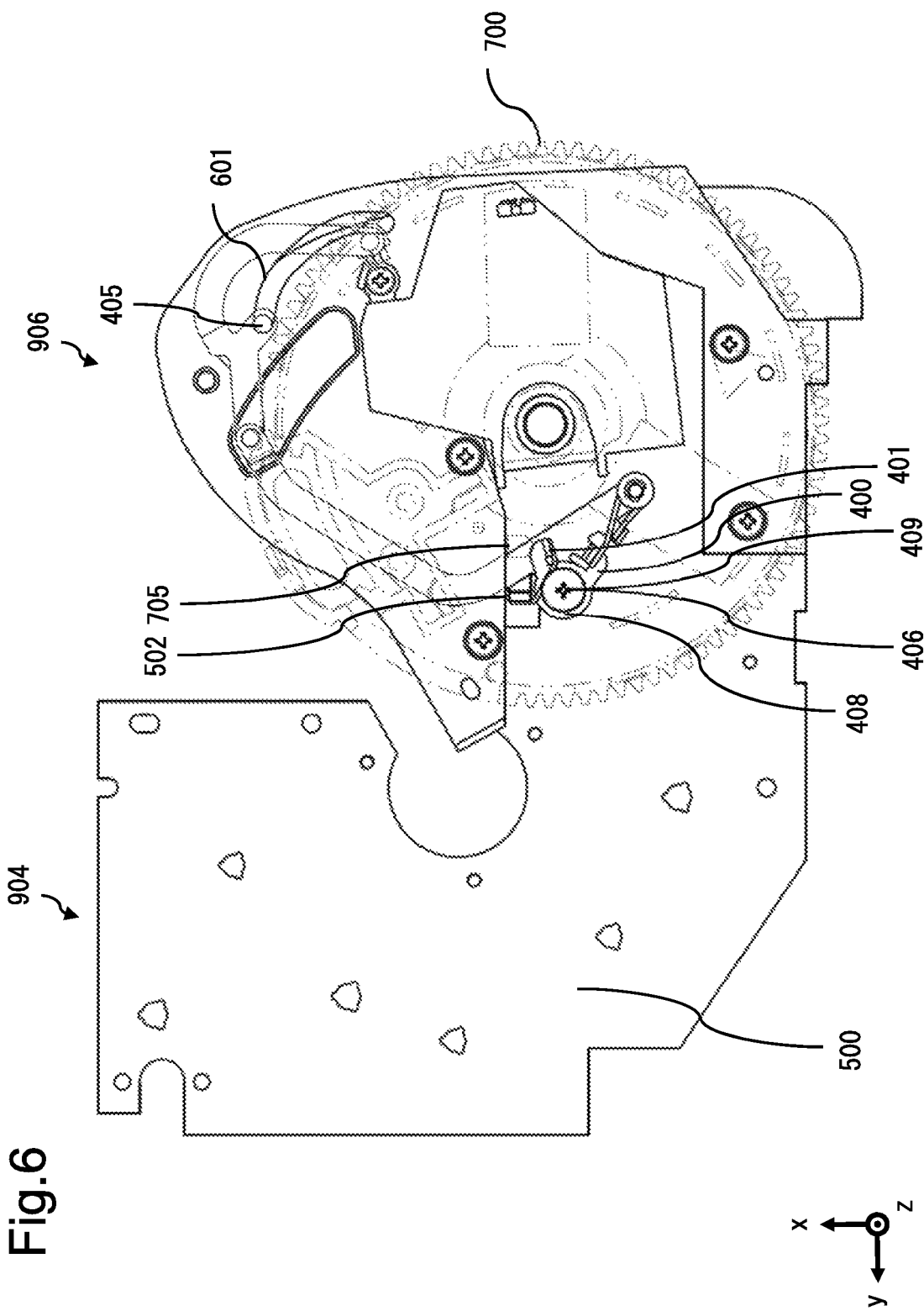
FIG. 6 is a top view illustrating one example of the configuration of the magnetic head cleaning mechanism according to the second example embodiment of the present invention.

FIG. 6 is a top view in which the cam gear 700 is seen through in FIG. 4. Note that the threading arm component 701, the spring for thread-side overdrive 702, and the spring for unthread-side overdrive 703 are omitted in FIG. 6.

As illustrated in FIG. 6, the brush arm component 400 is located under a screw 409, and pivotally supported rotatably by a pivot shaft 406. The brush arm component 400 is pressed by a brush evacuation side spring 408 via a pivot arm 401 in a direction of an evacuation position (counterclockwise when seen from an upper side on the pivot shaft 406).

The pivot shaft 406 is pressed in the base 500.

The brush evacuation side spring 408 is held at one end by a spring holding portion 502 provided on the base 500.

A brush arm press portion 705 is formed as a protruding portion (protrusion) on a bottom surface side of the cam gear 700. The brush arm press portion 705 presses the pivot arm 401 when the cam gear 700 is overdriven counterclockwise up to a predetermined position on a thread completion side, and rotationally drives the brush arm component 400 clockwise on the pivot shaft 406.

Figure 7:
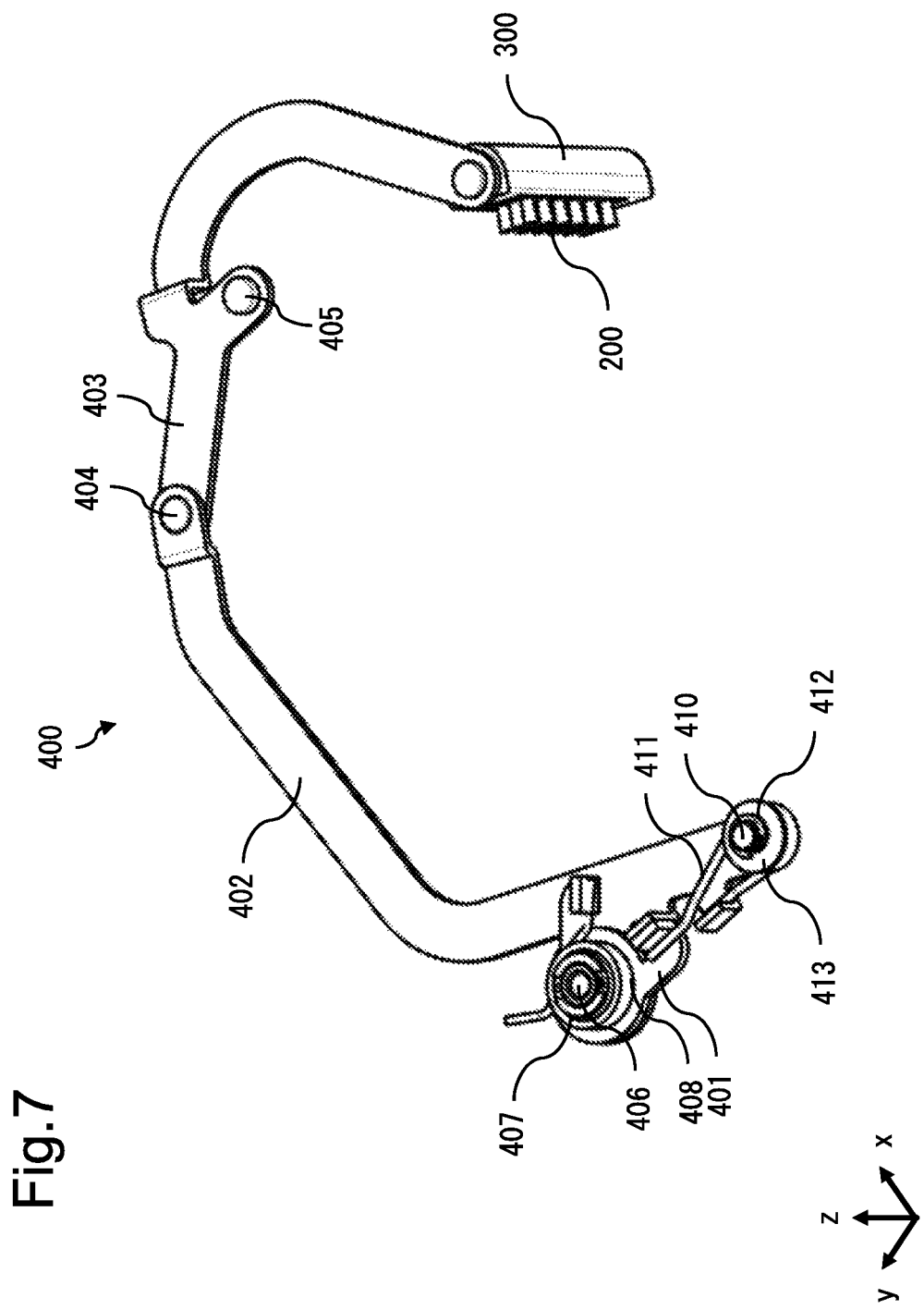
FIG. 7 is a perspective view illustrating one example of a configuration of a brush arm component according to the second example embodiment of the present invention.

FIG. 7 is a perspective view illustrating one example of a configuration of a brush arm component according to the second example embodiment of the present invention.

As illustrated in FIG. 7, the brush arm component 400 includes a support side arm 402, a brush side arm 403, and a pivot arm 401.

The brush side arm 403 has, at one end, a holder 300 holding the brush 200. The brush side arm 403 has a joint shaft 404 press-fit at another end. In other words, the brush arm component 400 is bendable in the joint shaft 404 being at an intermediate position. The joint shaft 404 pivotally supports one end of the support side arm 402 rotatably. The brush side arm 403 has a guide shaft 405 press-fit at a halfway position (a position where a position relative to the brush side arm 403 is fixed).

The guide shaft 405 has a columnar shape with about the same outside diameter as the width of a cam groove 601 (FIG. 6) formed in the cam plate 600. Thus, the brush side arm 403 is movable in such a way that the guide shaft 405 moves along the cam groove 601. Note that the cam groove 601 has such a shape that the brush 200 moves while avoiding a component in the magnetic tape device 900, and abuts on the magnetic head 100.

The support side arm 402 is pivotally supported by the pivot shaft 406, at an end on a side that is not pivotally supported on the brush side arm 403 by the joint shaft 404.

The pivot arm 401 is pivotally supported by the pivot shaft 406 coaxially with the support side arm 402.

A sleeve 407 is placed on outer periphery of the pivot shaft 406 rotatably on the pivot shaft 406.

The brush evacuation side spring 408 is placed on outer periphery of the sleeve 407 rotatably on the pivot shaft 406. The brush evacuation side spring 408 is held at one end by the spring holding portion 502 (FIG. 6) on the base 500, and held at another end by the pivot arm 401.

The pivot shaft 406 is pressed in the base 500, and provided with a screw hole at an upper end. As illustrated in FIG. 6, the screw 409 is screwed to the screw hole on the pivot shaft 406, and the pivot arm 401, the support side arm 402, the brush evacuation side spring 408, and the like are held (locked) by a screw head of the screw 409 in such a way that the pivot arm 401, the support side arm 402, the brush evacuation side spring 408, and the like do not come off the pivot shaft 406.

A spring shaft 410 is pressed in the support side arm 402. The spring shaft 410 pivotally supports, on outer periphery thereof, a cleaning side spring 411 coaxially rotatably.

An E-ring 412 and a washer 413 are placed on top of the spring shaft 410.

The cleaning side spring 411 is held by the E-ring 412 and the washer 413 in such a way that the cleaning side spring 411 does not come off the spring shaft 410. The cleaning side spring 411 is held at one end by the pivot arm 401, and held at another end by the support side arm 402.

With this configuration, press force transmitted from the cam gear 700 to the pivot arm 401 is transmitted to the support side arm 402 via resilience of the cleaning side spring 411. Thus, the pivot arm 401 and the support side arm 402 are integrally driven in conjunction with each other. Drive force of the support side arm 402 is transmitted to the brush side arm 403 via the joint shaft 404. Thus, the brush side arm 403 is driven in conjunction with the support side arm 402.

The cleaning side spring 411 is elastically deformed when drive force is further applied thereto from a state where the guide shaft 405 is moved up to and in collision with an end of the cam groove 601, and avoids locking of the brush arm component 400. Resilience of the cleaning side spring 411 in this instance works in such a way as to press the guide shaft 405 against a part contacting the end of the cam groove 601.

An operation according to the present example embodiment is described.

FIGS. 8 to 12 are diagrams illustrating an operation of the magnetic head cleaning mechanism according to the second example embodiment of the present invention. More specifically, FIGS. 8 to 12 illustrate an operation of the magnetic head cleaning mechanism 906 with elapse of time. Note that, for simplicity, in FIGS. 8 to 12, it is assumed that the cam gear 700 is presented in a see-through way, only an outer shape of the cam groove 601 is presented with regard to the cam plate 600, and only the spring holding portion 502 is presented with regard to the base 500. It is also assumed that presentation of other components of the magnetic tape device 900, such as the threading arm component 701, the spring for thread-side overdrive 702, the spring for unthread-side overdrive 703, and the thread stopper 704, is omitted. A curve formed by the magnetic tape 800 in FIGS. 8 to 12 indicates a path where the magnetic tape 800 is carried. In other words, a path surface where the magnetic tape 800 is carried is perpendicular to a Z-axis.

Figure 8:
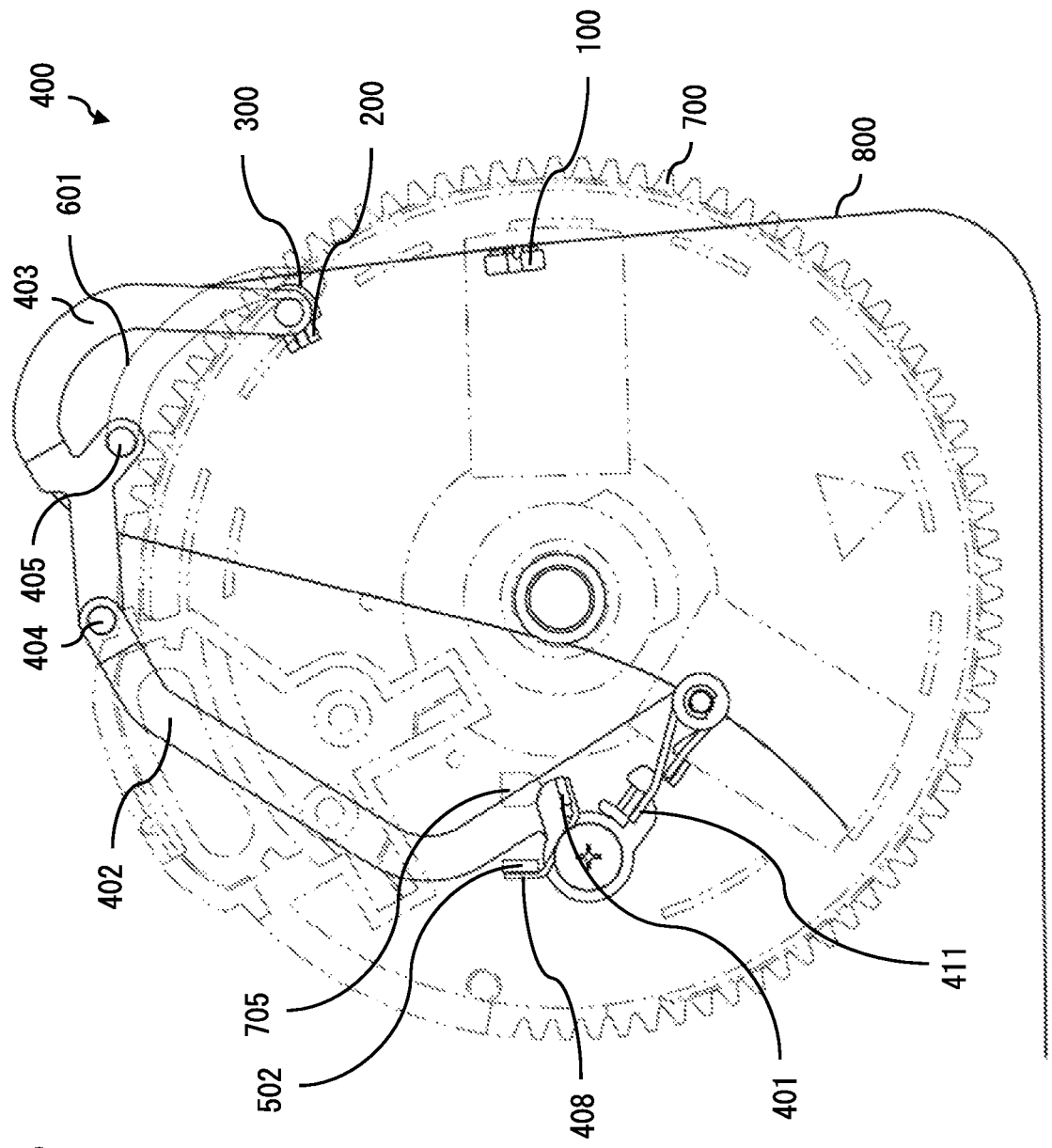
FIG. 8 is a view illustrating an operation of the magnetic head cleaning mechanism according to the second example embodiment of the present invention.

FIG. 8 illustrates a waiting state of the magnetic head cleaning mechanism 906. In a waiting state, the threading arm component 701 that pulls the magnetic tape 800 from the magnetic tape cartridge 907 contacts the thread stopper 704, and a thread operation is completed.

As illustrated in FIG. 8, in a waiting state, the brush arm press portion 705 formed in the cam gear 700 is not in contact with the pivot arm 401. The brush arm component 400 is held at an evacuation position by resilience of the brush evacuation side spring 408.

Figure 9:
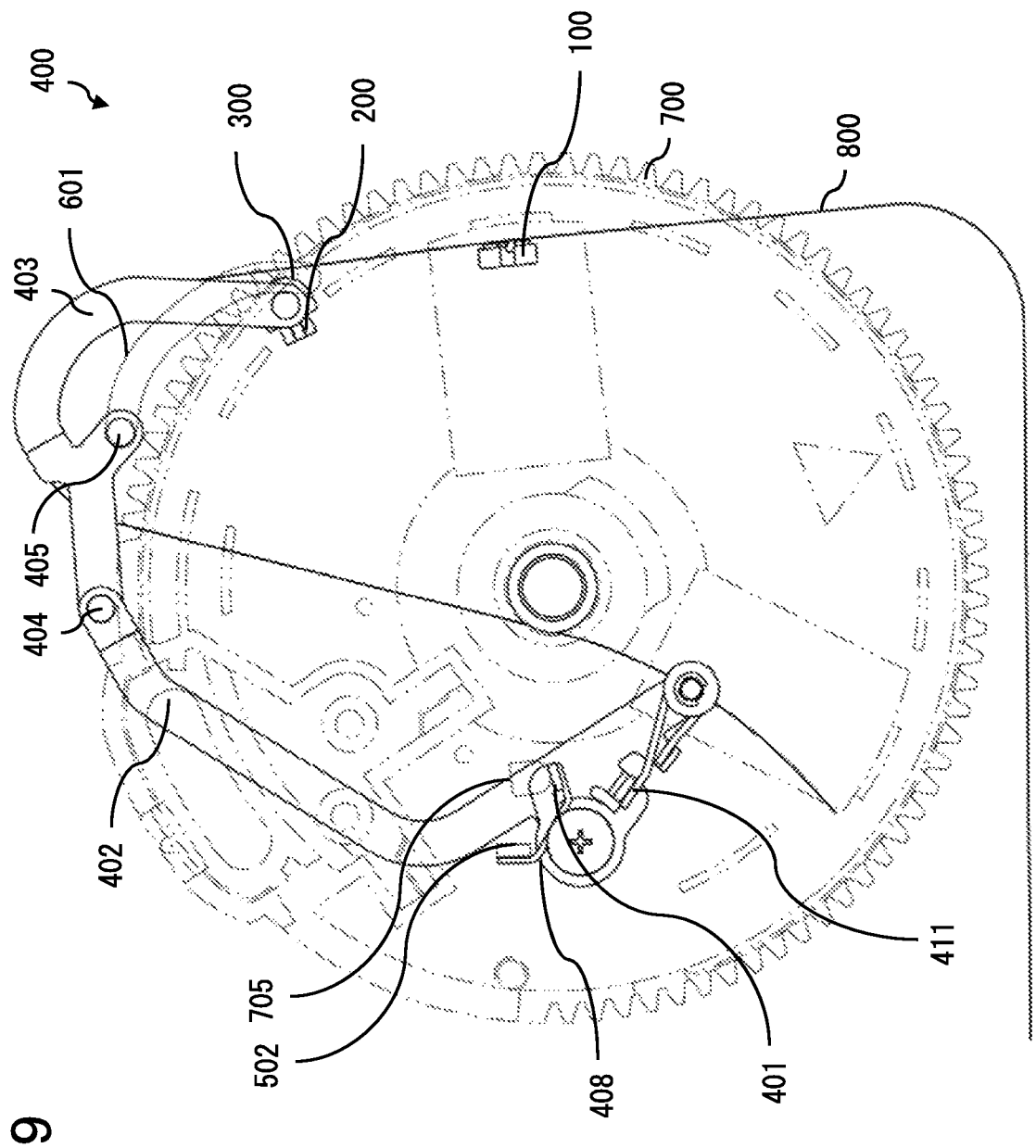
FIG. 9 is a view illustrating the operation of the magnetic head cleaning mechanism according to the second example embodiment of the present invention.

FIG. 9 illustrates a point where the cam gear 700 is overdriven counterclockwise from the waiting state illustrated in FIG. 8, and the brush arm press portion 705 of the cam gear 700 is in contact with one end of the pivot arm 401.

Figure 10:
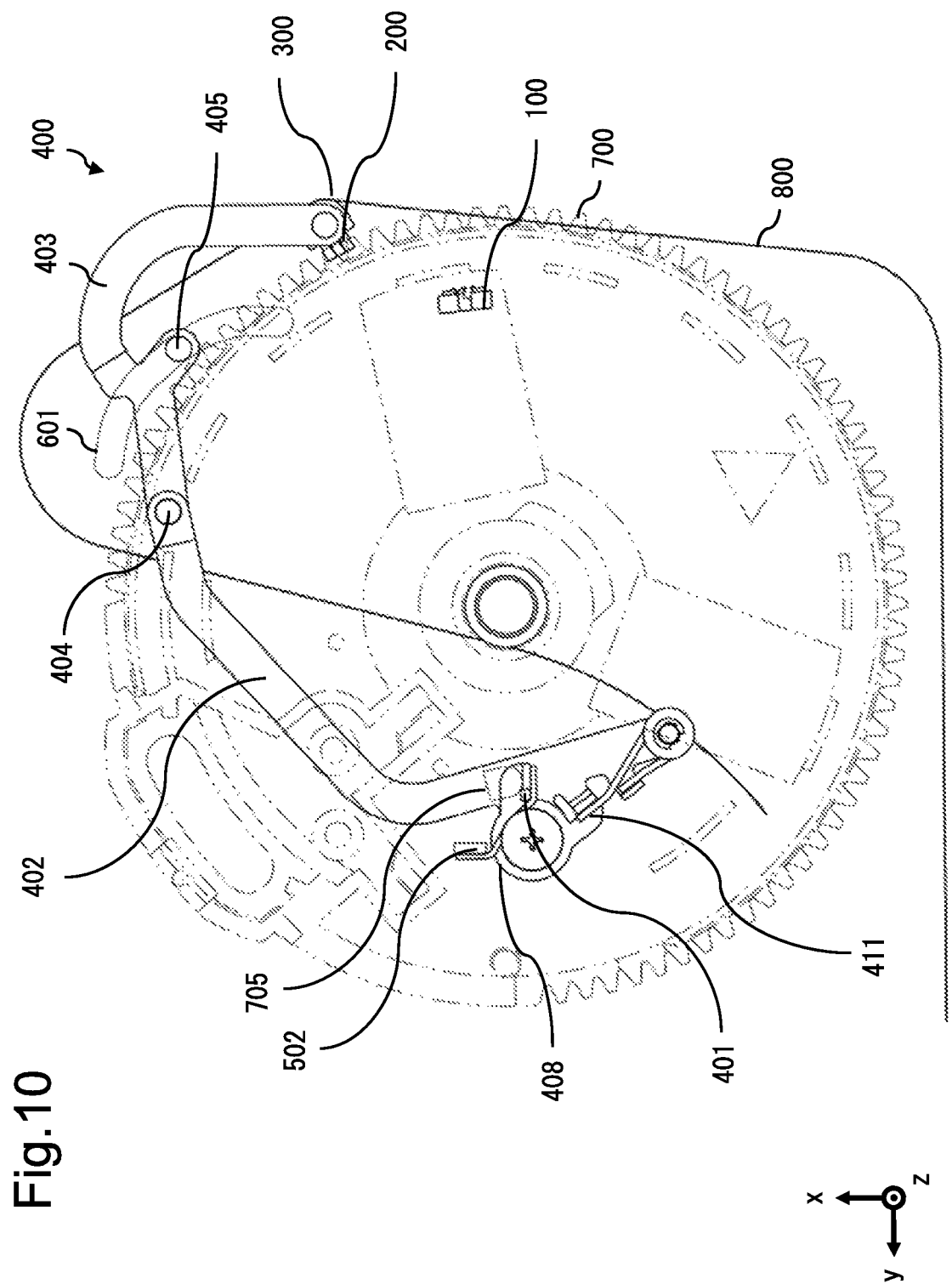
FIG. 10 is a view illustrating the operation of the magnetic head cleaning mechanism according to the second example embodiment of the present invention.

FIG. 10 illustrates a point where the cam gear 700 is further overdriven counterclockwise from the state illustrated in FIG. 9, and the brush arm press portion 705 of the cam gear 700 presses and then rotationally drives one end of the pivot arm 401. At this point, rotational drive force is transmitted to the support side arm 402 and the brush side arm 403 via the cleaning side spring 411, and the brush 200 and the holder 300 move along a direction defined by the cam groove 601.

At this point, the magnetic tape 800 being under predetermined tension by a magnetic tape winding motor (not illustrated) exists on a movement path of the holder 300. Thus, the holder 300 moves while pressing the magnetic tape 800 by a back surface side of a brush holding portion against the tension. As a result, as illustrated in FIG. 10, the magnetic tape 800 is in a state of being separated from the magnetic head 100.

Figure 11:
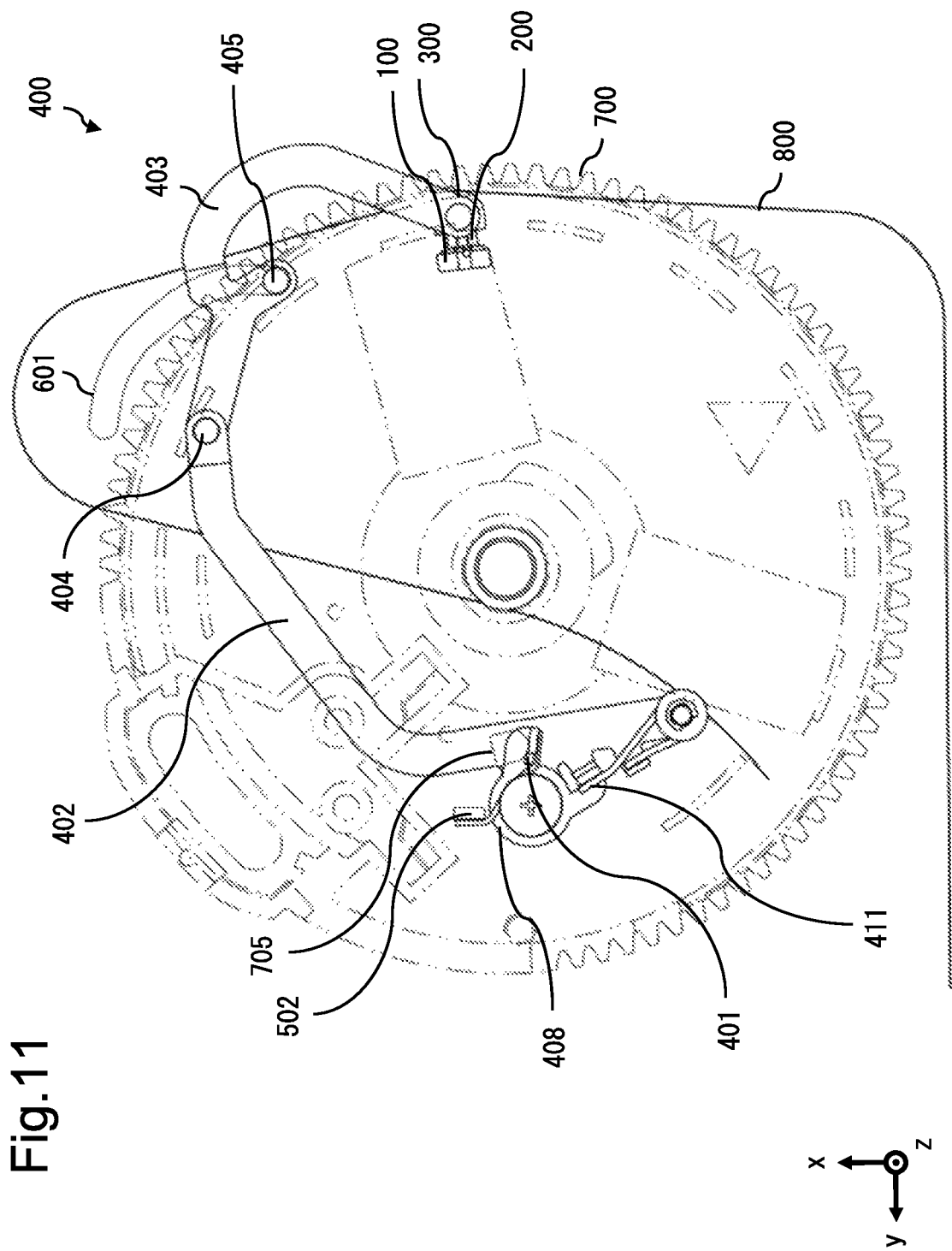
FIG. 11 is a view illustrating the operation of the magnetic head cleaning mechanism according to the second example embodiment of the present invention.

FIG. 11 illustrates a point where the cam gear 700 is further overdriven counterclockwise from the state illustrated in FIG. 10, and the guide shaft 405 of the brush side arm 403 comes into contact with the end of the cam groove 601.

As illustrated in FIG. 11, at this point, the brush 200 arrives at a cleaning position, and abuts on the magnetic head 100 head on. In this state, the magnetic head 100 is cleaned by being translated in a Z-axis direction. While contacting a back surface of the holder 300 by predetermined tension generated by the magnetic tape winding motor (not illustrated) during movement of the holder 300 as well, the magnetic tape 800 arrives at a lift position with the tension being maintained.

Figure 12:
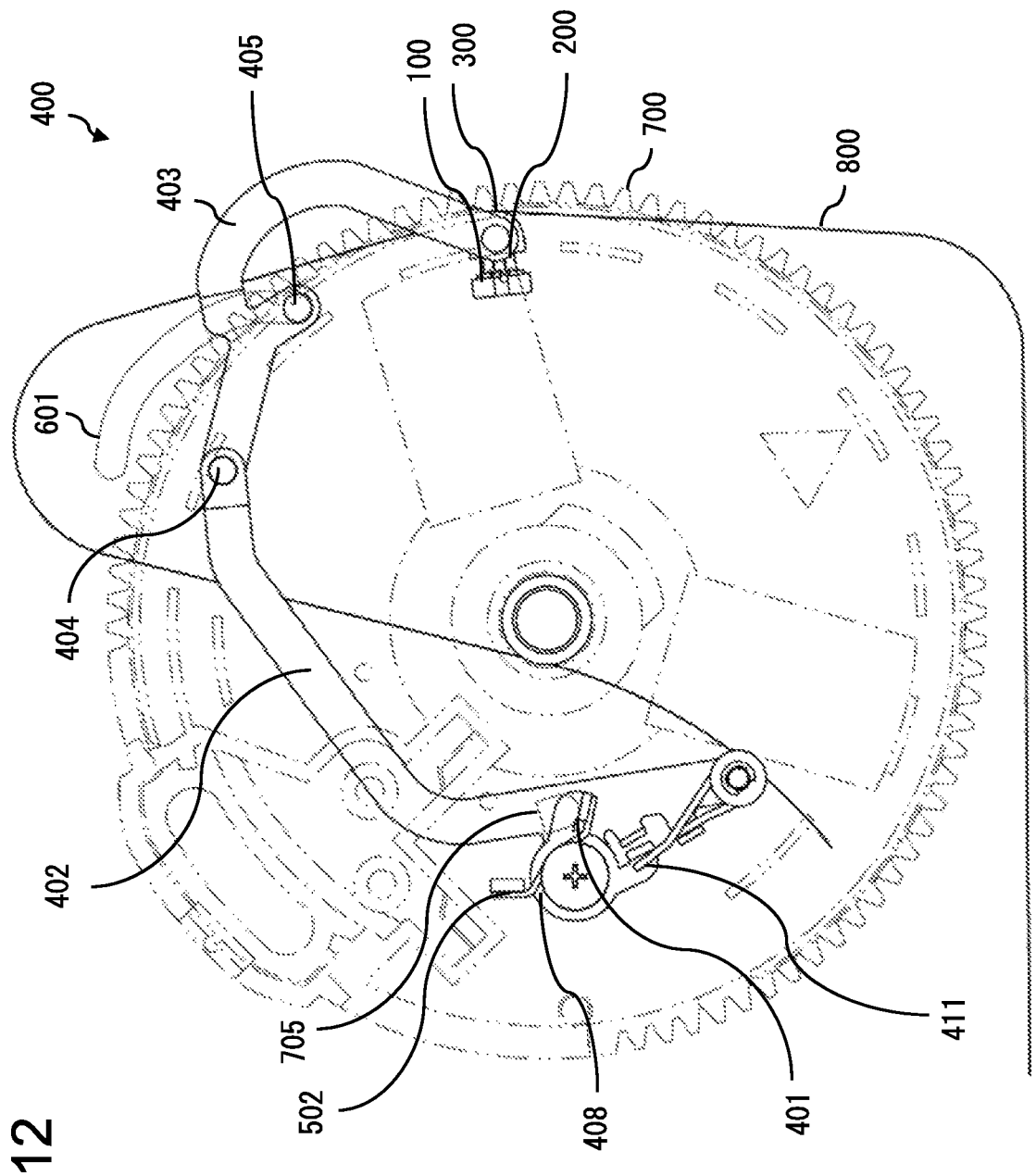
FIG. 12 is a view illustrating the operation of the magnetic head cleaning mechanism according to the second example embodiment of the present invention.

FIG. 12 illustrates a point where the cam gear 700 is further overdriven counterclockwise from the state illustrated in FIG. 11.

At this point, since the guide shaft 405 is in collision with the end of the cam groove 601, and therefore, is unable to move, drive force transmitted from the cam gear 700 is used for elastic deformation of the cleaning side spring 411. As a result, even when the cam gear 700 excessively rotates beyond the cleaning position, the cam gear 700 and the brush arm component 400 are prevented from being locked or broken. Resilience of the cleaning side spring 411 works in a direction in which the support side arm 402 is rotated in a brush driving direction. As a result, rattle generated between the support side arm 402 and the joint shaft 404 or between the guide shaft 405 and the cam groove 601 is suppressed.

The magnetic tape 800 is capable of being stopped or run at high speed in a state where the state illustrated in FIG. 12 is maintained. Thus, it is possible to suppress adhesion of the magnetic tape 800 resulting from long-term stopping, and wear of the magnetic head 100 resulting from high-speed running of the magnetic tape 800, and to clean the magnetic head 100 with the brush 200 by translating the magnetic head 100 in the Z-axis direction at desired timing.

The brush arm component 400 may be used as a tape lifter function that does not involve cleaning of the magnetic head 100.

An advantageous effect according to the present example embodiment is described.

As described above, in the magnetic tape device 900 according to the present example embodiment, the brush arm component 400 is driven in a thread state where the magnetic tape 800 is under tension. Thus, the magnetic tape 800 can be lifted from the magnetic head 100 by the brush arm component 400 without the magnetic tape 800 being unthreaded or tension of the magnetic tape 800 being loosened. Consequently, the magnetic head 100 can be cleaned while a high-speed running state or a stop state of the magnetic tape 800 being maintained. In addition, in the magnetic tape device 900, a tape lifter mechanism and a magnetic head cleaning mechanism are achieved by using the integrated brush arm component 400 having a simple structure. Therefore, the magnetic tape device 900 according to the present example embodiment has an advantageous effect of being able to perform cleaning of a magnetic head without unthreading a magnetic tape by a simple mechanism.

In the magnetic tape device 900 according to the present example embodiment, a tape lifter mechanism and a magnetic head cleaning mechanism are achieved by using the integrated brush arm component 400. Further, in order to achieve a tape lifter function and a magnetic head cleaning function, the magnetic head cleaning mechanism 906 may drive the integrated brush arm component 400. Thus, the magnetic tape device 900 does not need to have a drive mechanism in which a tape lifter mechanism is independent from a magnetic head cleaning mechanism.

Therefore, the magnetic tape device 900 according to the present example embodiment has an advantageous effect of being able to suppress an increase in manufacturing cost or an increase in device size.

In the magnetic tape device 900 according to the present example embodiment, the tape lifter mechanism, the magnetic head cleaning mechanism, and the threading mechanism share the cam gear 700 and a drive source thereof. Thus, in the magnetic tape device 900, the drive mechanism is simplified or reduced in size. Therefore, the magnetic tape device 900 according to the present example embodiment has an advantageous effect of being able to further suppress an increase in manufacturing cost or an increase in device size.

A modification example according to the present example embodiment is described.

In the present example embodiment described above, a threading mechanism is utilized as a drive source of the tape lifter mechanism and the magnetic head cleaning mechanism. However, in the present example embodiment, an existing mechanism, such as a cartridge loader mechanism, other than the threading mechanism may be utilized as a drive source of the tape lifter mechanism and the magnetic head cleaning mechanism. Alternatively, in the present example embodiment, a dedicated actuator or the like may be utilized as a drive source of the tape lifter mechanism and the magnetic head cleaning mechanism.

While being formed with coupled two arms in the present example embodiment described above, the brush arm component 400 may be formed by three or more arms.

While the present invention has been particularly shown and described with reference to example embodiments thereof, the present invention is not limited to these example embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2017-202497, filed on Oct. 19, 2017, the disclosure of which is incorporated herein in its entirety by reference.

INDUSTRIAL APPLICABILITY

The present invention is applicable for a purpose such as a reduction in manufacturing cost, a device size reduction, or the like in a magnetic tape device.

REFERENCE SIGNS LIST

150 Magnetic head
151 Contact surface
250 Cleaning unit
350 Holder
351 Operation surface
450 Cleaning arm
550 Cleaning arm drive unit
750 Magnetic head cleaning mechanism
850 Magnetic tape
950 Magnetic tape device 100 Magnetic head
200 Brush
300 Holder
400 Brush arm component
401 Pivot arm
402 Support side arm
403 Brush side arm
404 Joint shaft
405 Guide shaft
406 Pivot shaft
407 Sleeve
408 Brush evacuation side spring
409 Screw
410 Spring shaft
411 Cleaning side spring
412 E-ring
413 Washer
500 Base
501 Cam gear shaft
502 Spring holding portion
600 Cam plate
601 Cam groove
700 Cam gear
701 Threading arm component
702 Spring for thread-side overdrive
703 Spring for unthread-side overdrive
704 Thread stopper
705 Brush arm press portion
800 Magnetic tape
900 Magnetic tape device
901 In-device magnetic tape winding reel
902 In-cartridge magnetic tape winding reel
903 Cartridge load mechanism
904 Threading mechanism
905 Magnetic head mechanism
906 Magnetic head cleaning mechanism
907 Magnetic tape cartridge

What is claimed is:

1. A magnetic head cleaning mechanism comprising:
a cleaning arm including
a holder having a shape capable of separating a magnetic tape contacting a magnetic head from the magnetic head without wearing the magnetic tape in a state where the magnetic tape is under tension, and
a cleaning unit capable of contacting a contact surface of the magnetic head that contacts the magnetic tape in a state where the magnetic tape is separate from the magnetic head; and
a cleaning arm drive unit
driving the cleaning arm in such a way as to separate the magnetic tape contacting the magnetic head from the magnetic head without wearing the magnetic tape in a state where the magnetic tape is under tension, and
driving the cleaning arm in such a way that the cleaning unit comes in contact with the contact surface of the magnetic head that contacts the magnetic tape in a state where the magnetic tape is separate from the magnetic head, wherein
the holder is disposed at one end of the cleaning arm, and has a smooth operation surface being slidable without wearing the magnetic tape, and
the cleaning unit is disposed on a back side of the operation surface;
the cleaning arm drive unit
pushes, by the operation surface, the magnetic tape away from a side opposite to the contact surface of the magnetic head, and
moves the cleaning unit to a position facing the contact surface, and brings the cleaning unit into contact with the contact surface;
the cleaning arm drive unit drives the cleaning arm by a common drive force being provided from a drive power source and being shared with another drive mechanism;
the cleaning arm drive unit includes a cam gear having a protrusion formed on a surface, and being rotatable, by a drive force provided from the drive power source, around a first rotation axis perpendicular to a path surface where the magnetic tape is carried, and,
in the cleaning arm,
another end being on a side opposite to the one end of the cleaning arm is locked rotatably around a second rotation axis parallel to the first rotation axis, and,
when the cam gear is rotated, the cam gear is engaged with the protrusion, and when the cam gear is further rotated in a state of being engaged with the protrusion, the cleaning unit is moved to a position facing the contact surface, and brought into contact with the contact surface; and
the cam gear
transmits a drive force by rotating in a threading of the magnetic tape, and
moves the cleaning unit to a position facing the contact surface, and brings the cleaning unit into contact with the contact surface, by rotating beyond a rotation range in the threading.

2. The magnetic head cleaning mechanism according to claim 1, wherein
the cleaning arm further includes
a joint shaft being formed at an intermediate position of the cleaning arm and being bendable around a third rotation axis parallel to the second rotation axis, and
a guide shaft parallel to the third rotation axis, with a position relative to the one end of the cleaning arm being fixed, and
the magnetic head cleaning mechanism further comprises a cam groove that defines, in a state where the cleaning arm is engaged with the protrusion, when the cam gear is further rotated, movement of the guide shaft in such a way that the cleaning unit is moved to a position facing the contact surface, and brought into contact with the contact surface.

3. The magnetic head cleaning mechanism according to claim 2, wherein
the cleaning unit is a brush.

4. The magnetic head cleaning mechanism according to claim 1, wherein the cleaning unit is a brush.

5. A magnetic tape device comprising the magnetic head cleaning mechanism according to claim 1.

* * * * *